(12) United States Patent
Noguchi et al.

(10) Patent No.: US 8,818,103 B2
(45) Date of Patent: Aug. 26, 2014

(54) IMAGE RETRIEVAL METHOD, IMAGE RETRIEVAL PROGRAM, AND IMAGE REGISTRATION METHOD

(75) Inventors: Kazuto Noguchi, Sakai (JP); Koichi Kise, Sakai (JP); Masakazu Iwamura, Sakai (JP); Yukihito Furuhashi, Hachioji (JP); Taiji Mine, Chofu (JP)

(73) Assignees: Osaka Prefecture University Public Corporation, Osaka (JP); Olympus Corporation, Tokyo (JP)

( * ) Notice: Subject to any disclaimer, the term of this patent is extended or adjusted under 35 U.S.C. 154(b) by 461 days.

(21) Appl. No.: 13/254,234

(22) PCT Filed: Mar. 3, 2010

(86) PCT No.: PCT/JP2010/053446
§ 371 (c)(1),
(2), (4) Date: Nov. 17, 2011

(87) PCT Pub. No.: WO2010/101186
PCT Pub. Date: Sep. 10, 2010

(65) Prior Publication Data
US 2012/0051628 A1    Mar. 1, 2012

(30) Foreign Application Priority Data
Mar. 4, 2009   (JP) .................. 2009-050630

(51) Int. Cl.
G06K 9/46     (2006.01)
G06K 9/62     (2006.01)
G06F 7/00     (2006.01)
G06F 12/00    (2006.01)
G06F 17/30    (2006.01)

(52) U.S. Cl.
CPC ........ G06K 9/6211 (2013.01); G06F 17/30259 (2013.01)

USPC ........... 382/195; 382/159; 382/225; 707/737; 707/821; 707/765

(58) Field of Classification Search
CPC   G06K 9/00288; G06K 9/4671; G06K 9/6282
USPC ........... 382/159, 195, 225; 707/737, 821, 765
See application file for complete search history.

(56) References Cited

U.S. PATENT DOCUMENTS

| | | | |
|---|---|---|---|
| 7,382,897 B2 * | 6/2008 | Brown et al. ................. | 382/103 |
| 7,539,657 B1 * | 5/2009 | Liu et al. ......................... | 706/45 |
| 7,594,177 B2 * | 9/2009 | Jojic et al. ..................... | 715/720 |
| 8,363,973 B2 * | 1/2013 | Liu et al. ....................... | 382/266 |
| 8,489,627 B1 * | 7/2013 | Brandt ........................ | 707/765 |
| 2004/0202370 A1 * | 10/2004 | Fisher et al. .................. | 382/199 |
| 2008/0037877 A1 * | 2/2008 | Jia et al. ....................... | 382/224 |
| 2009/0052781 A1 * | 2/2009 | Fisher et al. ................... | 382/199 |
| 2009/0161962 A1 * | 6/2009 | Gallagher et al. ............. | 382/203 |
| 2010/0027895 A1 * | 2/2010 | Noguchi et al. ............... | 382/224 |
| 2010/0030778 A1 * | 2/2010 | Liu et al. ........................... | 707/6 |
| 2010/0080469 A1 * | 4/2010 | Liu et al. ....................... | 382/201 |
| 2010/0124378 A1 * | 5/2010 | Das et al. ..................... | 382/225 |
| 2010/0166309 A1 * | 7/2010 | Hull et al. ..................... | 382/176 |
| 2010/0195914 A1 * | 8/2010 | Isard et al. ..................... | 382/201 |
| 2011/0103691 A1 * | 5/2011 | Yun ............................... | 382/190 |

FOREIGN PATENT DOCUMENTS

WO    2008/026414 A1    3/2008

OTHER PUBLICATIONS

Li et al, Cascaded classification with optimal candidate selection for effective place recognition, 2008 IEEE, pp. 1493-1496.*
Philbin et al, "Object retrieval with large vocabularies and fast spatial matching" 2007 IEEE, pp. 1-8.*
International Search Report for corresponding International Application No. PCT/JP2010/053446 mailed Apr. 27, 2010.
International Preliminary Report on Patentability for corresponding International Application No. PCT/JP2010/053446 dated Jan. 21, 2011.
Ke et al., "PCA-SIFT: A More Distinctive Representation for Local Image Descriptors", Proc. of CVPR 2004, vol. 2, pp. 506-513, 2004.
Noguchi et al., "Efficient Recognition of Objects by Cascading Approximate Neighbor Searchers", Collection of Papers in Meeting on Image Recognition and Understanding (MIRU 2007), pp. 111-118, Jul. 2007.

Noguchi et al., "Experimental Evaluations of a Memory Reduction Method for Object Recognition Based on Descriptors", Collection of Papers in Meeting on Image Recognition and Understanding (MIRU 2008), pp. 251-258, 2008.

Noguchi et al., "Cascading Approximate Nearest Neighbor Searchers and Its Effects on Object Recognition (Kinji Sai Kinbo Tanasaku o Mochiita Buttai Ninshiki no Tameno Ta Dankaika to sono koka)", IEICE Technical Report, Jun. 21, 2007, vol. 107, Introduction, 4. Multiple Staging and concise explanation of relevance.

Noda et al., "Recognition of Road Markings from In-Vehicle Camera Images by Generative Learning Method (Seiseigata Gakushuho o Mochiita Shasai Camera Gaza kara no Romen Hyoji Ninshiki)", IEICE Technical Report, Oct. 16, 2008, vol. 108, No. 263, pp. 31 to 36, Outline, 3.4 Motion Blur and concise explanation of relevance.

\* cited by examiner

*Primary Examiner* — Kathleen Y Dulaney
(74) *Attorney, Agent, or Firm* — Renner, Otto, Boisselle & Sklar, LLP

(57) ABSTRACT

An image retrieval method comprising: a step of extracting at least one query feature vector from a query image on which a subject of the image retrieval is captured, the query feature vector representing a local feature of the query image; a step of accessing an image data base in which a plurality of reference images are stored previously, each reference image being stored in conjunction with learning images generated therefrom and reference feature vectors representing local features of the reference image and the learning images; a comparing step of comparing the query feature vector with the reference feature vectors stored in conjunction with each reference image using an approximate nearest neighbor search to find a reference feature vector approximately nearest to the query feature vector; and a selecting step of selecting a reference image with which the found reference feature vector is stored in conjunction from the reference images as a retrieval result wherein: the learning image is generated by adding a defocus and/or a motion-blur effect likely to occur on capturing the subject to each reference image, the reference feature vectors are extracted from each reference image and the learning image corresponding to the reference image respectively using the scale-space approach, the query feature vector is extracted from the query image using the scale-space approach, and each of the above steps is executed by a computer.

11 Claims, 6 Drawing Sheets

(a) LEARNING SET A (ORIGINAL IMAGE): NUMBER OF CORRESPONDENCES = 9, NUMBER OF FEATURE POINTS OF RIGHT IMAGE = 199

(b) LEARNING SET B: NUMBER OF CORRESPONDENCES = 31, NUMBER OF FEATURE POINTS OF RIGHT IMAGE= 575

(a) LEARNING SET C: NUMBER OF
CORRESPONDENCES = 36, NUMBER OF FEATURE
POINTS OF RIGHT IMAGE= 839

(b) LEARNING SET D: NUMBER OF
CORRESPONDENCES = 36, NUMBER OF FEATURE
POINTS OF RIGHT IMAGE= 1059

LEARNING SET Ddiag: NUMBER OF
CORRESPONDENCES = 16, NUMBER OF FEATURE
POINTS OF RIGHT IMAGE= 342

IMAGE RETRIEVAL METHOD, IMAGE RETRIEVAL PROGRAM, AND IMAGE REGISTRATION METHOD

TECHNICAL FIELD

The present invention relates to an image retrieval method, an image retrieval program, and an image registration method, and more particularly, to an image retrieval method, an image retrieval program, and an image registration method using, as a query, an image captured by a familiar image input apparatus such as a camera-equipped mobile phone.

BACKGROUND ART

Along with prevalence of camera-equipped mobile phones, the demand for a service using a camera not only as a device for simply shooting pictures but also as an input device. For example, there is known a service of ordering a product or presenting relevant information by shooting a product shown in a magazine, a catalog, or the like. For such a purpose, it is necessary to recognize an object in an image at a high speed and with a high accuracy.

The inventors have already proposed a method for recognizing an image at a high speed and with a high accuracy from a large-scale image database (see, for example, Patent Literature 1, Non-Patent Literatures 2 and 3). In the method, PCA-SIFT (see, for example, Non-Patent Literature 1) is used for local features representing the local characteristics of an image, local features of a query are compared with local features in an image database by using approximate nearest neighbor search, and an image that is the closest to the query is determined as a recognition result. It is noted that normally, a local feature is represented as a vector, as is the case in PCA-SIFT. Features of the methods of Patent Literature 1 and Non-Patent Literature 2 are cascading processing in which the degree of approximation is adjusted as appropriate in accordance with a query image to increase the speed of processing. A feature of the method of Non-Patent Literature 3 is reduction of a used amount of memory by using scalar quantization.

CITATION LIST

Patent Literature

Patent Literature 1: International Publication WO2008/026414

Non-Patent Literature

Non-Patent Literature 1: Y. Ke, and R. Sukthankar, PCA-SIFT: A More Distinctive Representation For Local Image Descriptors, Proc. of CVPR 2004, vol. 2, pp. 506-513, 2004.

Non-Patent Literature 2: Kazuto Noguchi, Koichi Kise, and Masakazu Iwamura: "Efficient Recognition of Objects by Cascading Approximate Nearest Neighbor Searchers", Collection of Papers in Meeting on Image Recognition and Understanding (MIRU 2007), pp. 111-118, July, 2007.

Non-Patent Literature 3: Kazuto Noguchi, Koichi Kise, and Masakazu Iwamura: "Experimental Study of Memory Reduction for Object Recognition based on Local Descriptors", Collection of Papers in Meeting on Image Recognition and Understanding (MIRU 2008), pp. 251-258, 2008.

SUMMARY OF THE INVENTION

Disclosure of the Invention

However, if the above method is applied to a query image captured by a camera-equipped mobile phone, there is a problem that a sufficient recognition rate cannot be obtained. It is considered that this is because local features extracted from a captured image change owing to deterioration such as blur or defocus which occurs when a closeup image of a catalog or the like is shot by a camera-equipped mobile phone. Here, blur and defocus are the same in that the contour of a shooting target (subject) becomes unclear, but are different in their causes. Blur occurs because a camera is not stationary at the moment of shooting. Defocus occurs because a subject is out of focus or a camera is deficient in resolution.

As methods for improving the recognition rate for such images deteriorated as described above, there are three possible approaches of (1) repairing the deterioration of the query image, (2) using local features that are robust to deterioration of images, and (3) learning images generated by adding deterioration to original images. In the method (1) of repairing the deterioration of an image, it is necessary to perform repairing processing at the time of recognition, and therefore, processing time becomes a problem. Regarding the method (2) of using local features that do not change in spite of deterioration, according to some technical literature, PCA-SIFT, which is also used in experiments described later for local features suitable to the method of the present invention, is relatively robust to defocus (see, for example, K. Mikolajczyk and C. Schmid, "A Performance Evaluation Of Local Descriptors" IEEE Transactions on Pattern Analysis 86 Machine Intelligence, vol. 27, no. 10, pp. 1615-1630, 2005). Therefore, it is not easy to further improve the method (2). That is, PCA-SIFT, and SIFT which is the base of PCA-SIFT are methods for extracting feature points indicating the local characteristics of an image, and local features corresponding to the feature points. The procedure of the extraction includes a process in which a Gaussian filter is sequentially applied to an original image while the scale of the Gaussian filter is increased at a certain rate, to generate smoothed images (scale space), and then an extremum is detected from a differential image between images of adjacent scales, to determine feature points and a scale. Therefore, it is considered that handling of defocus is already taken into consideration in the procedure of extracting local features. In addition, since a scale space is used, PCA-SIFT and SIFT are robust to change in the scale of an image.

Considering the above, the inventors focused on a method of learning deteriorated images generated from original images. The method is called generation-type learning, and is used in fields such as character recognition (see, for example, Hiroyuki Ishida, Tomokazu Takahashi, Ichiro Ide, Yoshito Mekada, and Hiroshi Murase "Recognition Method for Camera-Captured Low-Quality Characters using Blur Information", Collection of Papers in Meeting on Image Recognition and Understanding (MIRU 2006), pp. 180-186, July, 2006). Also in the field of image recognition using local features, there is proposed a method in which local areas are subjected to several thousand kinds of random conversions, and the resultant local areas are learned, whereby a high accuracy is obtained (for example, M. Ozuysal, M. Calonder, V. Lepetit, and P. Fua, "Fast Keypoint Recognition using Random Ferns" IEEE Transactions on Pattern Analysis and Machine Intelligence. to appear). However, in this literature, the effectiveness is only verified for an image database including as few as about several thousand images, and therefore, the effectiveness has not been confirmed for a large scale image database that the present invention assumes.

In the first place, it is known that the image recognition using local features is robust to partial occlusion, and distortion due to geometrical conversion, and that, among various types of local features, local features extracted by using a scale space are robust to, particularly, defocus and change in a lighting condition. However, in the image recognition using local features, a large number of local features need to be stored and processed. Therefore, studies mainly aiming to reduce a data amount and processing time have been conducted. On the other hand, in the generation-type learning, since learning patterns are generated from an original image, the amount of data to be registered into an image database increases. That is, the directionality of the image recognition technique using local features, and the directionality of the generation-type learning are incompatible. However, the inventors daringly tried combining both the methods, and found, contrary to expectation, that the recognition rate was greatly improved by tolerating increase in processing time to a certain extent.

In addition, it was found that if the method of Non-Patent Literature 2 for reducing processing time and the method of Non-Patent Literature 3 for reducing a memory amount were combined, a high recognition rate could be realized while a demerit of the generation-type learning was suppressed.

The present invention has been made in light of the above context, and provides an image retrieval method that can realize, with a high accuracy, image retrieval, i.e., image recognition using, as a query, particularly, an image captured by a familiar image input apparatus such as a camera-equipped mobile phone. In addition, the present invention provides an image registration method for generating an image database for the image retrieval. In addition, the present invention provides an image retrieval program for realizing the image retrieval method by computer processing.

Solution to the Problems

The present invention provides a method for solving problems such as blur and defocus by using the generation-type learning. Specifically, a plurality of images having blur or defocus are generated from an image to be registered, and local features are obtained from the generated images, whereby the probability that registered local features are present near each local feature of a query is increased. Problems of increase in a memory amount and increase in processing time which occur at this time can be solved by a combination of the cascading method of Non-Patent Literature 2 and the method of Non-Patent Literature 3 using scalar quantization.

That is, the present invention provides an image retrieval method comprising: a step of extracting at least one query feature vector from a query image on which a subject of the image retrieval is captured, the query feature vector representing a local feature of the query image; a step of accessing an image data base in which a plurality of reference images are stored previously, each reference image being stored in conjunction with learning images generated therefrom and reference feature vectors representing local features of the reference image and the learning images; a comparing step of comparing the query feature vector with the reference feature vectors stored in conjunction with each reference image using an approximate nearest neighbor search to find a reference feature vector approximately nearest to the query feature vector; and a selecting step of selecting a reference image with which the found reference feature vector is stored in conjunction from the reference images as a retrieval result wherein: each learning image is generated by adding a defocus and/or a motion-blur effect likely to occur on capturing the subject to each reference image, the reference feature vectors are extracted from each reference image and each learning image corresponding to the reference image respectively using the scale-space approach, the query feature vector is extracted from the query image using the scale-space approach, and each of the above steps is executed by a computer.

In another aspect, the present invention provides an image retrieval program for making a computer to execute steps comprising: extracting at least one query feature vector from a query image on which a subject of an image retrieval is captured, the query feature vector representing a local feature of the query image; accessing an image data base in which a plurality of reference images are stored previously, each reference image being stored in conjunction with learning images generated therefrom and reference feature vectors representing local features of the reference image and the learning images; comparing the query feature vector with the reference feature vectors stored in conjunction with each reference image using an approximate nearest neighbor search to find a reference feature vector approximately nearest to the query feature vector; and selecting a reference image with which the found reference feature vector is stored in conjunction from the reference images as a retrieval result wherein: each learning image is generated by adding a defocus and/or a motion-blur effect likely to occur on capturing the subject to each reference image, the reference feature vectors are extracted from each reference image and each learning image corresponding to the reference image respectively using the scale-space approach, and the query feature vector is extracted from the query image using the scale-space approach.

In another aspect, the present invention provides an image storing method for storing a reference image into an image data base for storing a reference image and used for an image retrieval of a particular reference image matched with a query image on which a subject of the image retrieval is captured, the method comprising the steps of: generating learning images by adding a defocus and/or a motion-blur effect likely to occur on capturing the subject to the reference image to be stored; extracting at least one reference feature vector from the reference image and each learning image respectively; and storing the reference feature vector and the learning images into the image data base in conjunction with the corresponding reference image, wherein: the reference feature vectors are extracted from the reference image and each learning image respectively using the scale-space approach; the image retrieval is executed through a procedure of extracting at least one query feature vector from the query image in the same manner as that of extracting the reference feature vector, of comparing the query feature vector with the respective reference feature vector extracted from the reference image and the learning images using an approximate nearest neighbor search to find the particular reference feature vector approximately nearest to the query feature vector and of selecting a reference image with which the found reference feature vector is stored in conjunction from the reference images; and each of the above steps is executed by a computer.

Effects of the Invention

In the image retrieval method of the present invention, each learning image is generated by adding a defocus and/or a motion-blur effect to each reference image, the reference feature vectors are extracted from each reference image and each learning image corresponding to the reference image by using the scale-space approach, and the query feature vector is extracted from the query image by using the scale-space approach. Therefore, it is possible to realize highly accurate image recognition, particularly, in the case of using, as a query, an image captured by a familiar image input apparatus that is small in size and weight such as a camera-equipped mobile phone.

The image retrieval program according to the present invention has the same merit as the above image retrieval method. In addition, the image database used in the image retrieval method can be generated by the image registration method according to the present invention.

The steps in the image retrieval method and the image registration method according to the present invention are executed by a CPU of a personal computer or a server, for example. Other than this, the steps may be executed by a CPU or a microcomputer of an apparatus such as a mobile terminal or a mobile phone, for example. The image retrieval program according to the present invention is an aspect of the present invention as a program causing such a CPU or a microcomputer to execute the above processing.

Several methods such as SIFT and PCA-SIFT are known as an algorithm for extracting local features from an image. In embodiments described later, PCA-SIFT is used. However, the present invention is not limited to PCA-SIFT. In the present invention, the features of a query image are represented by a plurality of query feature vectors extracted from the query image. The features of a reference image are represented by a plurality of reference feature vectors extracted from the reference image. Image retrieval is based on processing of comparing each query feature vector with reference feature vectors and finding a reference feature vector approximately nearest to the query feature vector.

Reference feature vectors are registered in an image database in advance, in conjunction with each reference image. A characteristic aspect of the present invention is that the comparison is performed by using not only reference feature vectors directly extracted from each reference image, but also local features extracted from each learning image generated by adding a defocus and/or a motion-blur effect to each reference image and applying a scale-space approach.

It is noted that if reference vectors extracted from learning images are simply added, the memory amount needed for an image database increases, and processing time increases because of comparison of an increased number of reference feature vectors. Therefore, in preferred embodiments, the present invention may be combined with the method of scalar quantization for saving the memory amount, and may be combined with the cascading method for saving processing time.

DESCRIPTION OF EMBODIMENTS

Figure 1:
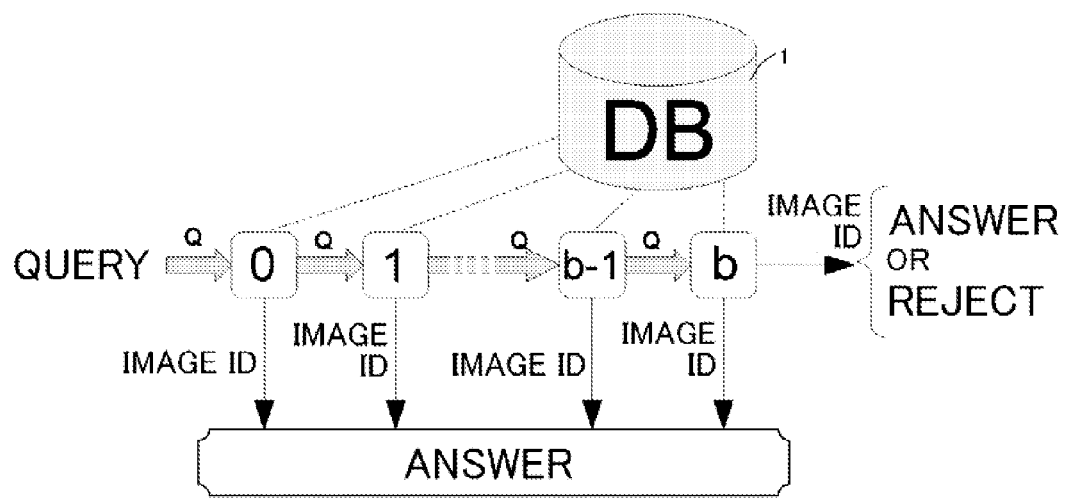
FIG. 1 is a diagram showing the configuration in which identification units are cascaded, according to the present invention.

Hereinafter, preferred embodiments of the present invention will be described.

In the image retrieval method according to the present invention, the comparing step may repeat the comparison of the query feature vector with each reference feature vector using plural degrees of approximation in order from rough to close corresponding to a processing load in order from light to heavy, respectively; and the selecting step may make the comparing step repeated to perform the comparison until a basis to determine the retrieval result is provided. That is, the image retrieval method may be combined with the cascading method. In this case, the comparing step starts the comparison, from a stage of a rough degree of approximation which needs a small amount of processing, gradually progressing to a stage of a close degree of approximation, and finishes the retrieval at the stage when a valid basis to determine the retrieval result is obtained. Therefore, comparison processing for a query image easy to identify is finished at an initial stage, that is, at an early stage where rough approximation is performed. On the other hand, in comparison processing for a query image difficult to identify, the retrieval result is determined after the comparison processing is repeated more times than in the comparison processing for the easy query image. Thus, the comparison is finished after the comparison is repeated a number of times corresponding to the ease of identification of a query image, that is, in a processing time corresponding to the ease.

In this case, the average processing time of the comparison for various query images can be largely reduced in comparison with the case where the comparison is performed with the degrees of approximation being set uniformly for any query images. This is because if the degrees of approximation are set uniformly, in order to obtain a recognition performance equal to that of cascading method, it is necessary to set the degrees of approximation based on the query image that is the most difficult to identify. As a result, the degrees of approximation for query images easy to identify become closer than necessary, and the comparison for the query images is performed taking a long time. Here, in the present invention which performs comparison using the cascading method, if, along with the progression of the stage of approximation, cumulative comparison is performed by using the results of approximation obtained at the previous stages, processing time does not largely increase even for a query image that is the most difficult to identify, in comparison with the case where the degrees of approximation are set uniformly. Such cumulative comparison is possible (see Non-Patent Literature 2). Therefore, the problem of the increase in processing time can be solved by introducing the generation-type learning.

In addition, the image retrieval method may further comprise a scalar quantization step of quantizing a vector dimension of each reference feature vector into a predetermined number of bits. That is, the image retrieval method may be combined with the method of scalar quantization. In this case, it is possible to reduce a memory amount needed for registering an image while the recognition rate is almost maintained, in comparison with the case where the method of scalar quantization is not used. Therefore, the problem of the increase in memory amount can be solved by introducing the generation-type learning.

In addition, the scalar quantization step may quantize each vector dimension into two bits or less. This is because the experiments described later verified that, even if the memory amount is largely reduced by quantizing each vector dimension into two bits or less, the recognition rate does not largely decrease.

Each learning image may be generated by adding the motion-blur-effect in a horizontal direction and/or in a vertical direction. That is, if a learning set is created by using images to which the motion-blur-effect is added only in a horizontal direction and/or in a vertical direction, a maximum effect can be obtained while the increase in processing time and the increase in memory amount due to the introduction of generation-type learning are kept to a minimum in comparison with the case where the learning images further includes images to which the motion-blur-effect is added in an oblique direction.

The preferred modes described above may be combined with each other.

Hereinafter, the present invention will be further described in detail with reference to the drawings. It is noted that the following description is in all aspects illustrative. It should not be understood that the following description limits the present invention.

First, a basic procedure of the object recognition method using approximate nearest neighbor search, which is the premise of the present embodiment, will be described. Thereafter, creation of learning data by generation-type learning will be described.

1. Object Recognition Method Using Approximate Nearest Neighbor Search (Method as Premise)

An object recognition method suitable to the present invention uses approximate nearest neighbor search including processing of high-speed recognition by the cascading method and processing of memory amount reduction by scalar quantization. A hash function which is commonly used in registration into an image database and image retrieval based on the approximate nearest neighbor search will be described. Thereafter, the registration, and then the retrieval will be described.

1.1. Hash Function and Extraction of Feature Vector

First, a hash function which is a basic element in approximate nearest neighbor search will be described. A hash table and a hash function are well known in the field of the retrieval. Here, the hash function will be described focusing on a specific procedure according to the present invention for registering local features into the hash table. It is noted that local features are extracted by using PCA-SIFT. That is, a process of extracting query feature vectors and a process of extracting reference feature vectors are executed by using PCA-SIFT. A 36-dimensional feature vector x obtained by PCA-SIFT is the result of a principal component analysis. Therefore, the eigenvalue of a lower dimension of the feature vector x is larger. Then, let the first to d-th dimensions (d≤36) of x be represented by expression 1.

$$\hat{x} = (x_1, x_2, \ldots, x_d) \qquad \text{[Expression 1]}$$

$$u_j = \begin{cases} 1 & \text{if } x_j - \mu_j \geq 0, \\ 0 & \text{otherwise,} \end{cases} \qquad \text{[Expression 2]}$$

Next, by using expression 2, each dimension is converted to a binary value, thereby creating a bit vector represented by expression 3.

$$u = (u_1, \ldots, u_d) \qquad \text{[Expression 3]}$$

Here, $\mu_j$ is an average value of vectors $x_j$ of all target images.

[Expression 4]

$$H_{index} = \left( \sum_{i=1}^{d} u_i 2^i \right) \bmod H_{size} \qquad (1)$$

Then, a hash value is obtained by using expression 4. Here, mod represents remainder operation, and $H_{size}$ is the size of a hash table.

1.2. Registration of Reference Images and Reference Feature Vectors into Image Database Reference feature vectors are registered into a hash table by using the aforementioned hush function. In the hash table, feature vectors whose data amounts have been reduced by scalar quantization are registered together with IDs of reference images. When collision occurs in the registration, a plurality of feature vectors are registered as a linked list (hereinafter, simply referred to as a list). At this time, if the list is excessively long, there arises a problem that the processing amount of distance calculations in retrieval excessively increases. Accordingly, in the present embodiment, an upper limit value c is set for a list length n. If n>c is satisfied, the whole list is deleted from the hash table. If there are a large number of reference feature vectors having the same hash value, the reference feature vectors do not greatly contribute to identification of images. Therefore, it is considered that the influence of the deletion of the whole list is relatively small.

The above processing is performed for all feature vectors to be registered into an image database, whereby registration of data for reference images into the image database is completed.

1.3. Retrieval (Comparison) of Image Database by Cascading Method

In the retrieval (comparison), high-speed processing is realized by the cascading method shown in FIG. 1.

FIG. 1 is a diagram showing the configuration of the cascading method according to the present invention. In FIG. 1, squares numbered 0 to b represent identification units for executing retrieval processing at respective stages. An identification unit having a smaller number performs retrieval by rougher approximation. Each of the identification units compares each of query feature vectors representing the features of a query, with reference feature vectors representing the feature points included in an image database 11, by approximate nearest neighbor search, obtains a referenced feature vector approximately nearest to each query feature vector, and then obtains the IDs of reference images from which the reference feature vectors have been extracted. Voting processing is performed for each of the IDs of the reference images to which the respective query feature vectors correspond, and a reference image to which the largest number of query feature vectors correspond is determined as an answer of retrieval.

First, the identification unit at the first stage executes retrieval processing for a set of query feature vectors obtained from a query image, whereby recognition of the query image is performed. At this stage, if a valid basis, which is described later, has been obtained, the recognition processing is ended and the result of recognition is determined as an answer. On the other hand, if a valid basis has not been obtained, the identification unit at the next stage, which performs closer approximation, executes retrieval processing for the set of query feature vectors, whereby recognition of the query image is performed again.

The load of comparison processing by rough approximation is light because the amount of data to be compared is small, and the load of comparison processing by close approximation is heavy. In the cascading method shown in FIG. 1, the degree of approximation is gradually changed from rough approximation to close approximation. A part of processing (some of retrieval targets) in retrieval by close approximation overlaps with processing in retrieval by rough approximation performed at previous stages. In light of the above respect, each identification unit can be configured to use the results obtained at previous stages, for the part of processing that overlaps with the processing performed at the previous stages, and to newly perform the other part of retrieval processing.

If a valid basis has not been obtained even when the retrieval has been performed at each stage to reach the final stage (b+1-th stage), a reference image that has obtained the most votes may be determined as an answer, or the query image may be rejected. By the above processing, it is expected that the efficiency largely increases in recognition of images for which processing is ended at an early stage, and it becomes possible to perform recognition with a longer time as necessary.

Images that can cause error in recognition have a characteristic that, in the first place, the images obtain few votes, and that, even if the image obtains a certain number of votes, the number of votes of the image is almost equal to the number of votes of the second place candidate. In light of this respect, whether or not the basis is valid can be determined as follows. If $V_1 > t$ and $rV_1 > V_2$ are satisfied at the same time where $V_1$ is the number of votes of the first place candidate and $V_2$ is the number of votes of the second place candidate, the processing is ended to determine the image of the first place candidate as an answer. It is noted that t is a threshold value of the number of votes and that r is a threshold value of the ratio between the number of votes of the first place candidate and the number of votes of the second place candidate.

1.4. Processing by Each Identification Unit (Comparison and Selection at Each Stage)

Processing performed by the identification unit at each stage will be described. Each identification unit retrieves, from a hash table, reference feature vectors that are to be determined to be the nearest neighbor of each query feature vector q obtained from a query image. However, the result obtained by approximate nearest neighbor search may be an approximately nearest neighbor but is not necessarily the nearest neighbor because the result includes approximation. This is because retrieval accuracy is traded off for processing time. However, the retrieval accuracy that is traded off is compensated by voting processing described later. Here, a set of the reference feature vectors that have been obtained is represented as X. Next, the Euclidian distance between a vector obtained by scalar-quantizing each query feature vector q, and each vector included in X, is calculated, whereby a reference feature vector X* that is determined to be the nearest neighbor is obtained.

Then, a vote is given to the ID of a reference image corresponding to X*. If there are a plurality of reference feature vectors that are determined to be the nearest neighbor, voting processing in which a vote is given to every ID of reference images corresponding to the plurality of reference feature vectors, and then a reference image that has obtained the most votes is determined, is performed. The voting processing is performed for all the query feature vectors of the query image, and a reference image that has eventually obtained the most votes is selected as an answer (retrieval result).

In the processing by each identification unit, the step of retrieving the set of feature vectors X corresponding to each query feature vector q determines the degree of approximation. In the case of performing the roughest approximation (at the first stage), as in the registration, a bit vector is obtained from each query feature vector q, and feature vectors having the same hash value are obtained by using a hash function.

In the case of performing rough approximation, considering the possibility that the value of each dimension of a feature vector varies depending on a shooting condition, the retrieval is performed coping with the variation. Specifically, the variation is coped with in the following manner, using a variation range e of the value of each dimension as a parameter.

$$q=(q_1, \ldots, q_d) \quad \text{[Expression 5]}$$

Let q be denoted by expression 5.

$$|q_j - \mu_j| \le e \quad \text{[Expression 6]}$$

If a dimension j satisfies expression 6, retrieval of reference feature vectors is performed by using not only $u_j$ but also expression 7.

$$u'_j = (u_j + 1) \bmod 2 \text{ (If uj is 0, u'j is 1, and if uj is 1, u'j is 0)} \quad \text{[Expression 7]}$$

The above processing is performed for each feature vector in order starting from the highest dimension. As the retrieval processing proceeds to a later stage in the cascading method, that is, as the degree of approximation becomes closer, the number of dimensions, of each of the query feature vectors and the reference feature vectors, for which the processing is to be performed is increased. If the processing reaches at the final stage (the b-th stage), $2^b$ bit vectors are to be dealt with. Here, it is possible to easily perform the retrieval processing by using the bit vectors other than those for which the processing have been already performed at the previous stages (see Non-Patent Literature 2). Therefore, the increase in the processing amount due to the cascading method can be suppressed to a minimum.

2. Generation of Learning Images (Generation-Type Learning) by Using Scale-Space Method Next, generation of learning images will be described. There are several possible causes for deterioration that occurs when a planar object such as a book or a picture is captured. The present invention assumes that defocus and blur are the greatest causes, and takes some measure against them.

The simplest and most effective method for coping with defocus and blur is a method using generation-type learning. In the method, learning images are generated by applying various defocuses and blurs to their original images, and feature vectors are extracted also from the learning images, to be used in recognition. The extracted feature vectors are used, as learning data, in the processing by each identification unit, together with feature vectors extracted from the original images.

In the present invention, since the recognition is performed by nearest neighbor search for local features, the increase in the learning data leads to increase in a memory amount needed, and increase in processing time. Accordingly, in order to decrease the learning data as much as possible, the following assumption for blur is set. A book or a picture that is a shooting target is not likely to move, and blur occurs by a shooting button being pressed when an image is shot. Therefore, it is assumed that blur occurs only in the vertical direction or the horizontal direction.

In the present embodiment, local features are extracted from original images, and from a set of learning images (learning set) generated from the original images.

Figure 2:
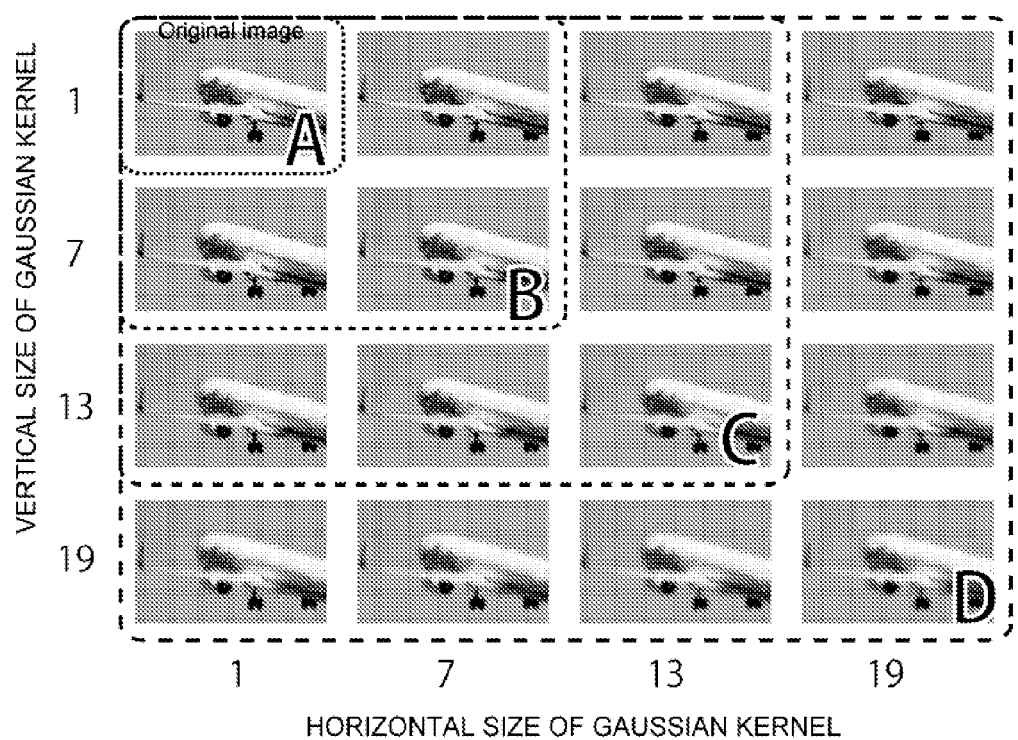
FIG. 2 is a diagram showing an example of an original image and learning images generated from the original image, according to the present invention.

FIG. 2 is a diagram showing an example of a learning set including an original image and learning images obtained by applying defocus or blur to the original image. Learning images were generated by blurring an image in the image database 11 using a Gaussian filter while the kernel size is varied. Learning sets A to D which are collections of images indicated by frame lines in FIG. 2 were generated in accordance with the degrees and the types of defocus and blur. Combinations selected from among 1, 7, 13, and 19 [pixels] were used for the vertical and horizontal kernel sizes. An image whose vertical and horizontal kernel sizes are different has blur. It is noted that the sizes of the images in the image database 11 used in experiments were almost equal to a QVGA size (320×240).

Here, in PCA-SIFT, a scale space is created by using a plurality of images having different degrees of defocus, and feature points are obtained, whereby invariance of scale is realized. Therefore, it is possible that features different from those of an original image are extracted from the corresponding image having blur, whose vertical and horizontal kernel sizes are different from each other. On the other hand, only the same feature points as those of an original image are extracted from the corresponding image having defocus, whose vertical and horizontal kernel sizes are equal to each other, and therefore, it is considered that addition of such an image to a learning set does not largely increase the recognition rate.

However, contrary to expectation, it was found that if such an image having defocus, whose vertical and horizontal kernel sizes were equal to each other, was added to a learning set, the recognition rate increased, and thus the effectiveness of the present invention was verified. It is considered that the reason is associated with the point that in creation of a scale space by PCA-SIFT, the scale of a Gaussian filter is discretely expanded. That is, it is considered that the reason is that if the degree of defocus of a query image is between the discrete scales, feature points different from those of an original image can be extracted from the corresponding image. In order to verify this, a learning set $D_{diag}$ was created by extracting the images (diagonal components in FIG. 2) whose vertical and horizontal kernel sizes were equal to each other, from the images included in the learning set D.

Figure 3:
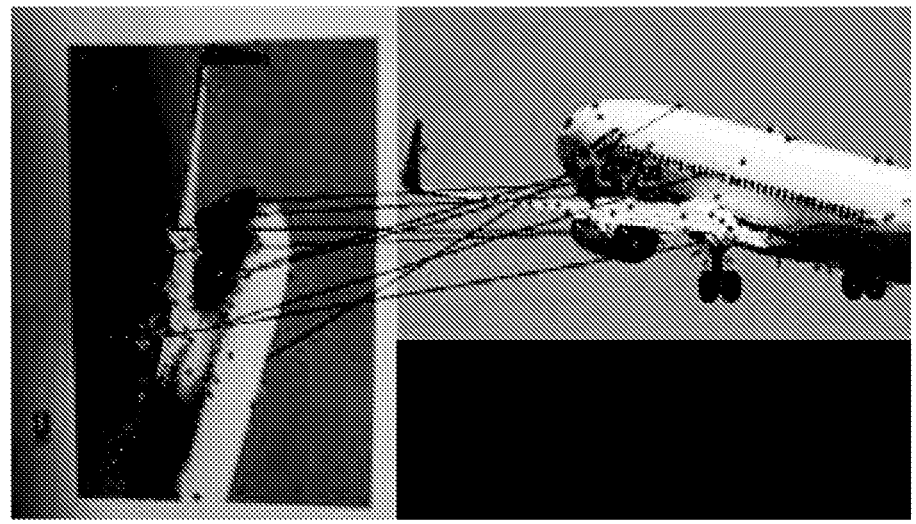
FIG. 3 is the first diagram showing, as an example indicating the effectiveness of generation-type learning according to the present invention, the number of feature points in each learning set (right) corresponding to feature points of an image (left) captured by a camera of a mobile phone, and the correspondence relationships therebetween.
Figure 3:
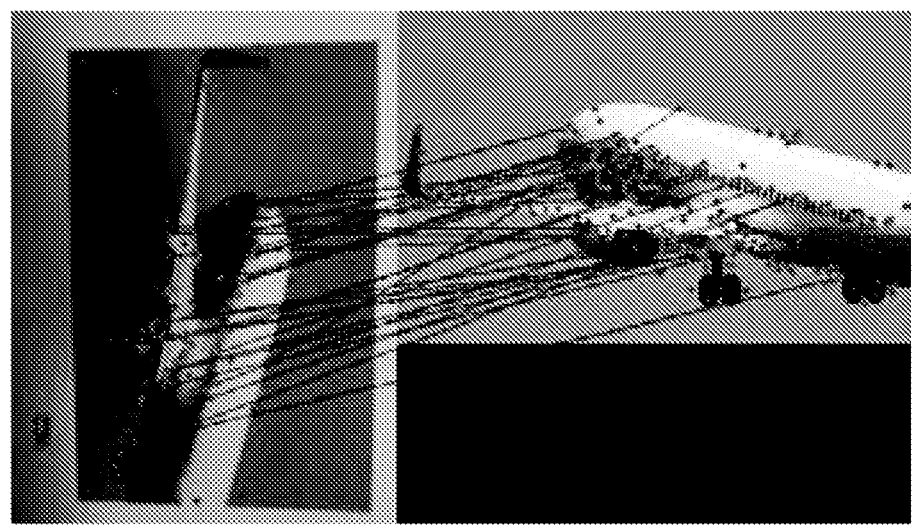
Figure 4:
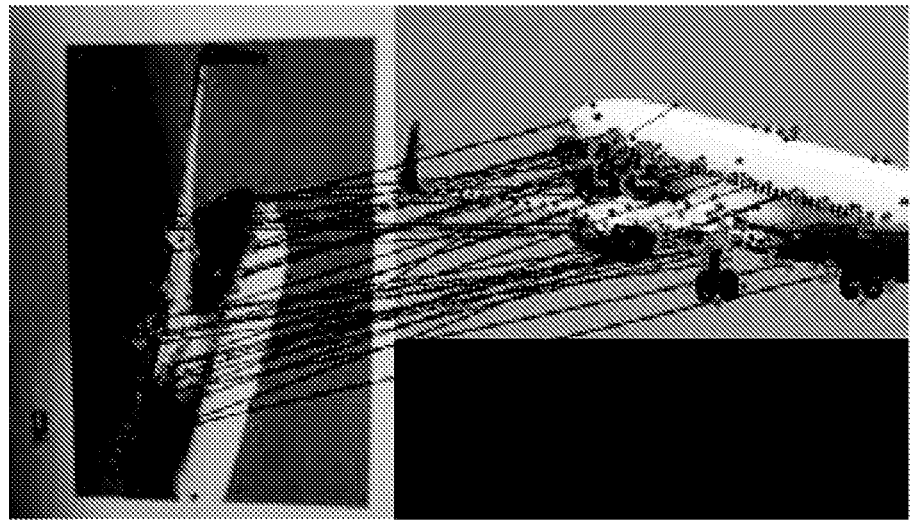
FIG. 4 is the second diagram showing, as an example indicating the effectiveness of the generation-type learning according to the present invention, the number of feature points in each learning set (right) corresponding to feature points of an image (left) captured by a camera of a mobile phone, and the correspondence relationships therebetween.
Figure 4:
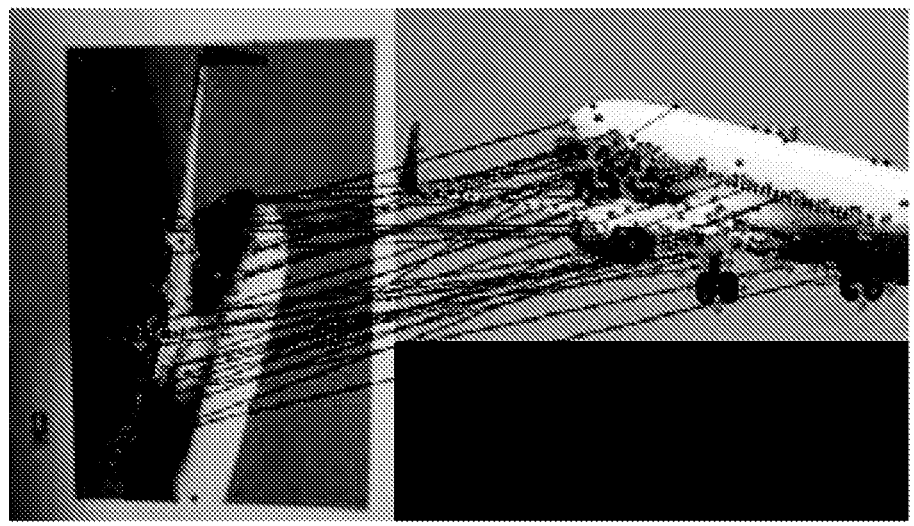
Figure 5:
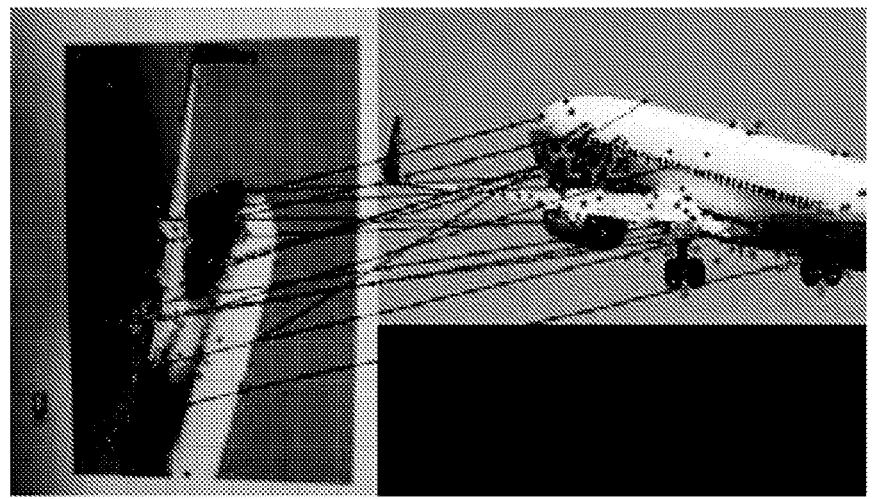
FIG. 5 is the third diagram showing, as an example indicating the effectiveness of the generation-type learning according to the present invention, the number of feature points in each learning set (right) corresponding to feature points of an image (left) captured by a camera of a mobile phone, and the correspondence relationships therebetween.

FIGS. 3 to 5 are diagrams showing the one-to-one correspondence relationships between local features obtained from each image in the learning sets A, B, C, D and $D_{diag}$ according to the present invention, and local features of a captured image obtained by shooting an original image with a mobile phone. The number of feature points (portions where local features were obtained) of the left image (captured image) was 134. It is noted that for convenience of explanation, the right images are shown by an identical image (an image in the learning set A), but the feature points indicate portions where local features were obtained from each learning set.

Specifically, a local feature that is the most similar to each local feature of the captured image (a local feature whose distance to each local feature of the captured image is the smallest) was discovered from each learning set, and if the distance was equal to or smaller than a threshold value, it was determined that the discovered local feature had a correspondence relationship with the local feature of the captured image. As shown in FIG. 3(a), in the learning set A, nine local features had one-to-one correspondence relationships with local features of the captured image. As shown in FIG. 3(b), in the learning set B, thirty-one local features had one-to-one correspondence relationships with local features of the captured image. The thirty-one local features in the learning set B included the nine local features in the learning set A. Therefore, in the learning set B, twenty-two local features were newly obtained in comparison with the learning set A. As shown in FIG. 4(a), in the learning set C, thirty-six local features, which were five more than in the learning set B, had one-to-one correspondence relationships with local features of the captured image, and as shown in FIG. 4(b), in the learning set D, thirty-six local features, which were as many as in the learning set C, had one-to-one correspondence relationships with local features of the captured image.

In FIGS. 3 to 5, dots represent the feature points, and lines represent the correspondence relationships. It is found that the larger number of blurred images the learning set had, the larger number of correspondence relationships were obtained. Also in the learning set $D_{diag}$ shown in FIG. 5, a larger number of correspondence relationships than in the learning set A were obtained, and thus it is found that there was some effect.

From the above, it is found that, by using generation-type learning, the number of feature points in a learning set having correspondence relationships with feature points of an image captured by a mobile phone increased, that is, a reference feature vector that is nearer each query feature vector extracted from a query image was discovered. This indicates that a query image is similar to images in a learning set, that is, a query image has blur and defocus. It is noted that the above "correspondence relationships" were a result of processing obtained by using only images that commonly correspond to one original image. Therefore, the recognition result obtained in the case where various images were registered is shown in the experiments.

3. Experiments

3.1. Experiment Condition

In order to verify the effectiveness of the present invention, the following experiments were conducted. In the experiments, image databases and query images described below were used. Local features were extracted by using PCA-SIFT (which is provided at http://www.cs.cmu.edu/yke/pcasift/). The size of a hash table represented by the following expression was used.

$$H_{size} = 2^d \qquad \text{[Expression 8]}$$

Processing times shown in the description below are times taken in recognition per one query image.

It is noted that the processing times do not include times taken in extraction of feature vectors. A calculator having a CPU of AMD Opteron (registered trademark) of 2.8 GHz and a memory of 64 GB was used.

3.1.1. Image Database

Figure 6:
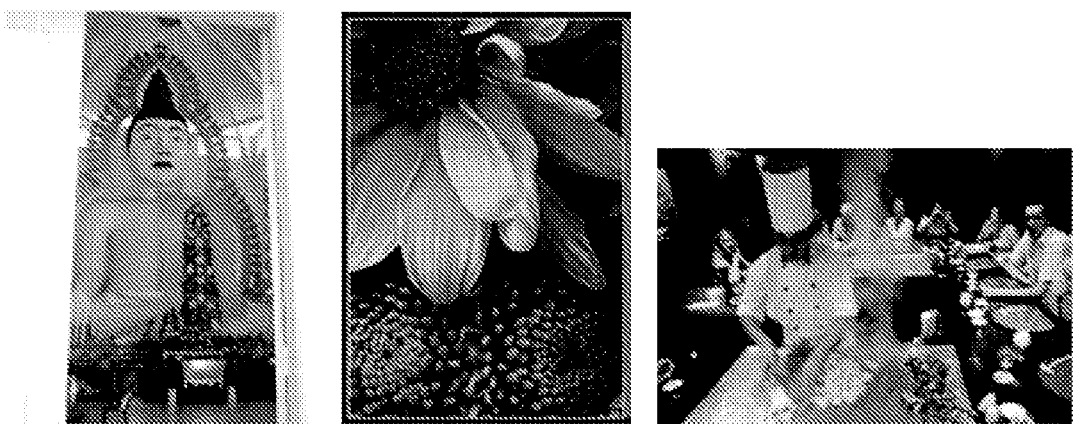
FIG. 6 is a diagram showing an example of registered images according to the present invention.

Images used in the experiments will be described. An image database included 100,000 images collected on "flickr" which is a photograph sharing site by using tags of "animal", "birthday", "food", "japan", and the like. The image database mainly included photographs of an object, nature, a person, and the like as shown in FIG. 6. It is noted that the sizes of the images were reduced such that the longitudinal sides of the images were equal to or smaller than 320 pixels.

Table 1 shows the number of feature points obtained from each learning set described in Section 2. The more an image is blurred, the smaller the number of PCA-SIFT feature points obtained from the image is. Therefore, the number of feature points did not increase in comparison with the number of images.

TABLE 1

| Kinds of learning sets | | |
| --- | --- | --- |
| Learning set | Number of blurred images generated (including original images) | Total number of extracted feature points (when number of original images was 10,000) |
| A | 1 | $5.0 \times 10^6$ |
| B | 4 | $1.6 \times 10^7$ |
| C | 9 | $2.6 \times 10^7$ |
| D | 16 | $3.3 \times 10^7$ |
| $D_{diag}$ | 4 | $9.8 \times 10^6$ |

In the experiments, a threshold value for scalar quantization that was obtained from an image database of 10,000 images was used for image databases of any numbers of images.

3.1.2. Query Images

Two kinds of query images, that is, query images for recognition and query images for rejection were created. The query images for recognition were obtained by shooting 1,000 images randomly selected from the image database. A specific creation procedure was as follows. First, each set of four or sixteen images that were arranged were printed to a sheet of A4 paper. A color laser printer was used for the printing. Shooting persons shot the sheets so as to include the entirety of each image, using respective different mobile phones. At this time, the image size was set at QVGA (320× 240), and a macro mode was set as shown in Table 2. The query images for rejection were obtained by printing 1,000 images that were not included in the image database, and shooting the printed images in a manner similar to the above manner. Table 2 shows the average numbers of feature points per one image.

TABLE 2

| Kinds of queries | | | |
| --- | --- | --- | --- |
| Shooting person | Shot paper | Macro | Number of feature points |
| 1 | For recognition | Used | 335 |
| 2 | Divided into 16 | | 324 |
| 3 | | Not used | 194 |
| 4 | | | 95 |
| 5 | For recognition | Not used | 310 |
| 6 | Divided into 4 | | 314 |
| 7 | | | 258 |
| 8 | | | 227 |
| 9 | For rejection | Not used | 133 |
| 10 | | | 73 |

3.2. Experiments without Rejection 3.2.1. Learning Sets

First, an influence of generation-type learning on the recognition rate was investigated. The number of registered images were 10,000. The cascading method and quantization, which might have a bad influence on the recognition rate, were not performed (that is, a feature vector was represented by a vector each dimension of which was 16 bits). Parameters in the processing were set as b=10, c=100, d=28, and e=400. The result is shown in Table 3. Eight shooting persons shot images. As the learning set was changed in the order of A, B, C, and then D in FIG. 2, the recognition rate increased. In the learning set D, the recognition rate was 93.3%, which increased by 12.3% from 81.0% in the learning set A (original image). In comparison among the shooting persons, the shooting person 3 indicated the largest effect, in which the recognition rate increased by 31.7% from 57.0% to 88.7%. The shooting person 4 indicated the second largest effect. As shown in FIG. 2, the shooting persons 3 and 4 shot images without a macro mode, by using the sheets of A4 paper each having 16 images printed thereon. Therefore, it is considered that the degrees of defocus of the shot images were larger than those of the other query images, and that, as a result, the method of the present invention provided a great effect. In the learning set $D_{diag}$, the recognition rate increased by 10% from that of the learning set A though the recognition rate was smaller than that of the learning set D. Processing of giving blur was not performed for the learning set $D_{diag}$. Therefore, it is found that a certain degree of effect was obtained even by performing only processing of giving defocus.

On the other hand, regarding the processing time, it is found that the larger the number of feature points in the learning set was, the longer the processing time was. For example, the learning set C included five times as many feature points as the learning set A, and the processing time of the learning set C was about two times as long as that of the learning set A. The memory amounts actually used for the learning sets A, B, C, and D, which include a memory amount other than that for feature vectors, and a memory amount for overhead, were 2.5 GB, 3.5 GB, 4.3 GB, and 4.5 GB, respectively, that is, the memory amount increased in the order of A, B, C, and then D. In this way, the improvement in the recognition rate due to the increase in the number of images in the learning set was realized at the expense of the processing time and the memory amount.

Figure 7:
FIG. 7 is a diagram showing an example of query images that succeeded to be recognized by using a learning set C in experiments of the present invention.

FIG. 7 shows images that failed to be recognized in the learning set A and that succeeded to be recognized in the learning set C. It is found from FIG. 7 that even images blurred or defocused a lot could be recognized.

TABLE 3

Recognition rate [%] and processing time [ms] for each kind of learning sets and each kind of queries

| Shooting person | A (Original image) | | B | | C | | D | | $D_{diag}$ | |
|---|---|---|---|---|---|---|---|---|---|---|
| | Recognition rate | Processing time | Recognition rate | Processing time | Recognition rate | Processing time | Recognition rate | Processing time | Recognition rate | Processing time |
| 1 | 90.8 | 10.6 | 95.3 | 16.5 | 96.1 | 19.9 | 96.6 | 22.1 | 95.4 | 12.8 |
| 2 | 87.7 | 11.4 | 93.1 | 17.6 | 93.3 | 21.4 | 93.7 | 23.0 | 91.4 | 13.9 |
| 3 | 71.8 | 5.3 | 81.7 | 8.4 | 86.7 | 10.6 | 88.5 | 11.5 | 85.2 | 6.6 |
| 4 | 57.0 | 2.5 | 78.3 | 4.0 | 87.2 | 5.1 | 88.7 | 5.8 | 85.2 | 3.2 |
| 5 | 91.3 | 9.7 | 94.7 | 15.0 | 95.1 | 18.1 | 95.5 | 20.4 | 94.1 | 11.7 |
| 6 | 89.2 | 9.2 | 95.0 | 14.4 | 96.3 | 18.1 | 96.4 | 20.3 | 94.4 | 11.4 |
| 7 | 87.0 | 6.9 | 96.2 | 10.9 | 97.0 | 13.4 | 97.1 | 15.2 | 95.6 | 8.8 |
| 8 | 73.5 | 6.2 | 85.2 | 9.3 | 88.9 | 11.8 | 90.2 | 13.3 | 86.8 | 7.6 |
| Average | 81.0 | 7.7 | 89.9 | 12.0 | 92.6 | 14.8 | 93.3 | 16.4 | 91.0 | 9.5 |

3.2.2. Scalability

From the experiments thus far, it is found that the recognition rate can be improved by increasing the number of feature points in the learning set. However, there is a possibility that the increase in feature points to be registered into a hash table might have a bad influence on the scalability of the method of the present invention. Accordingly, in the present section, three elements of the recognition rate, the processing time, and the memory amount were investigated by using the learning set C while the number of registered images was increased up to 100,000. Parameters were set as b=400, c=100, d=28, e=400, t=4, and r=0.4. The experiments were conducted in both cases where the cascading method was used and the cascading method was not used. In scalar quantization, the number of bits of each dimension was set at 2 and 16 (no quantization).

Figure 8:
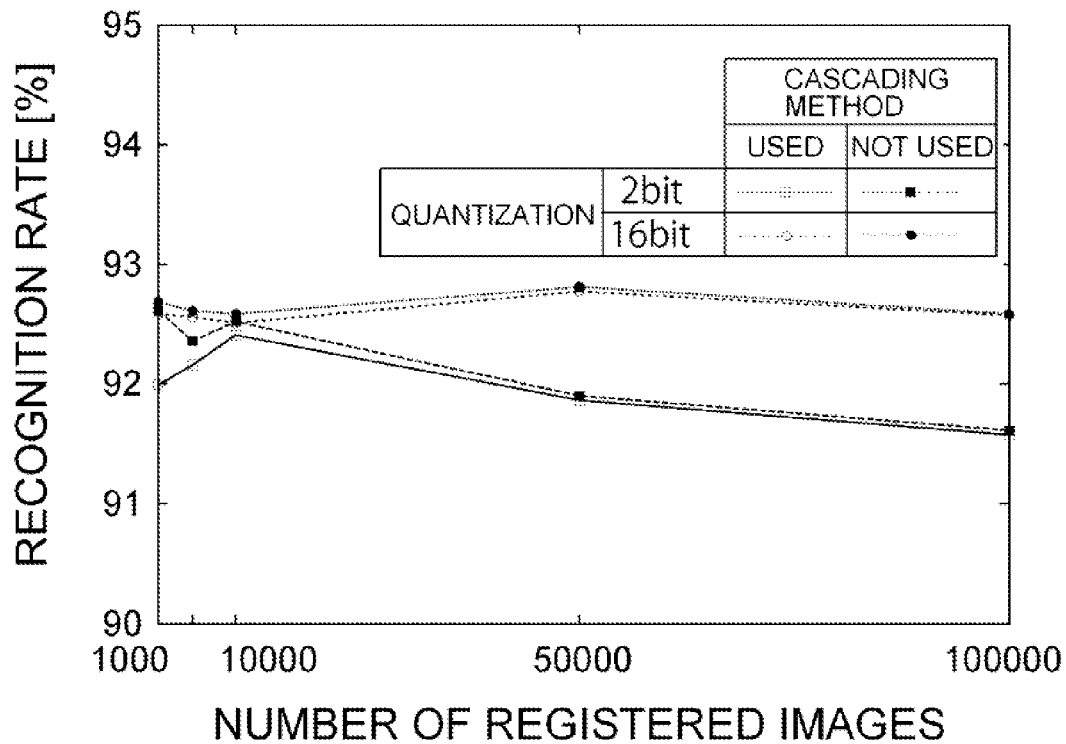
FIG. 8 is a graph showing the relationships between the number of registered images and recognition rate, obtained in the experiments of the present invention in the cases where the cascaded identification units were used and the cascaded identification units were not used.

FIG. 8 shows the recognition rate. In the case where quantization was not performed, the recognition rate was almost constant as being 92.5% even when the number of registered images was 100,000. In the case where each dimension was quantized into two bits, the recognition rate decreased by up to about 1%. On the other hand, decrease in the recognition rate due to the cascading method hardly occurred.

Figure 9:
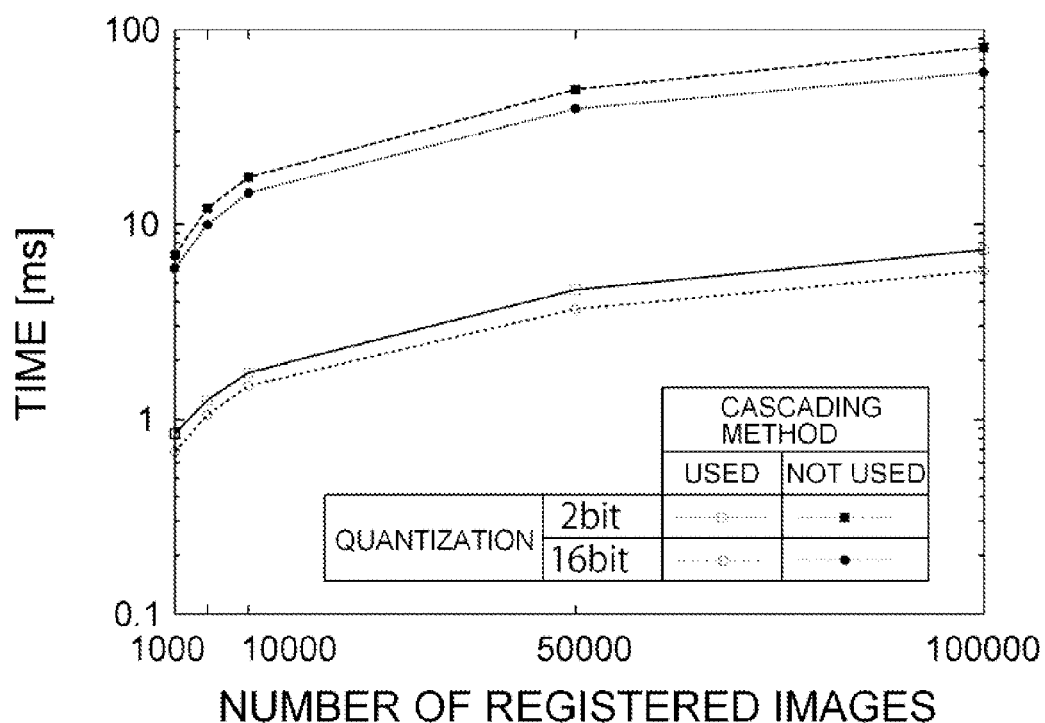
FIG. 9 is a graph showing the relationships between the number of registered images and recognition rate, obtained in the experiments of the present invention in the cases where scalar quantization was performed and scalar quantization was not performed.

FIG. 9 shows the processing time. It is found that the processing time was reduced to about 1/10 by using the cascading method. In the case where quantization was not performed, an extra processing time was needed for processing of quantizing feature vectors of a query.

In the case where the number of registered images was 100,000, when quantization was not performed, the memory amount was 22.6 GB, and when each dimension was quantized into two bits, the memory amount was 6.7 GB, which is about 1/3 of 22.6 GB. In the case where the number of registered images was 10,000, when each dimension was quantized into two bits, the recognition rate was 92.4%, the processing time was 1.7 ms, and the memory amount was 2.7 GB. In Section 1, in the case of using the learning set A, that is, in the case where generation-type learning was not performed, the recognition rate was 81.0%, the processing time was 7.7 ms, and the memory amount was 2.5 GB. Therefore, it can be said that by using a combination of the cascading method and the quantization, a high-speed and highly accurate recognition could be realized with almost the same memory amount.

3.3. Experiments with Rejection

TABLE 4

Result in case where rejection was performed

| Criterion for determining parameters (for learning set) | | | Query for recognition | | | | Query for rejection | | |
|---|---|---|---|---|---|---|---|---|---|
| | | | $C_1$ [%] | $E_1$ [%] | $R_1$ [%] | Processing time [ms] | $E_2$ [%] | $R_2$ [%] | Processing time [ms] |
| Criterion A | min ($E_1 + E_2 + R_1$), | Processing time of 1 ms or less | 84.6 | 1.0 | 14.4 | 0.5 | 3.9 | 96.1 | 0.8 |
| Criterion B | min ($E_1 + E_2 + R_1$), | Processing time of 10 ms or less | 88.1 | 0.4 | 11.5 | 1.3 | 0.9 | 99.1 | 5.5 |
| Criterion C | min ($E_1 + E_2 + R_1$), | Processing time of 100 ms or less | 90.1 | 0.3 | 9.6 | 13.8 | 1.7 | 98.3 | 68.8 |

Finally, the result of the experiment with rejection, in which the number of registered image was 10,000 and the learning set C was used, will be described. Evaluation scales of the result are defined as follows. First, in the case where an image corresponding to a query image is present, a recognition rate $C_1$, an erroneous recognition rate $E_1$, a rejection rate $R_1$ were used (where $C_1$, $E_1$, and $R_1$ satisfy $C_1+E_1+R_1=1$). In the case where an image corresponding to a query image is not present, an erroneous recognition rate $E_2$, and a rejection rate $R_2$ were used (where $E_2$ and $R_2$ satisfy $E_2+R_2=1$). In the experiment, 10-fold cross validation was used. Parameters were obtained for the learning sample by using three types of criteria shown in Table 4, and were applied to a test sample. Every combination of parameters selected from b=5, 10, and 15, c=2, 5, 10, and 100, d=20, 24, and 28, e=200, 400, and 600, r=0.2, 0.4, and 0.6, and t=4, 8, and 12, was used. Table 4 shows the result. The processing time for the query images for rejection were longer than that for the query images for recognition. This is because the processing needs to reach the final stage in order to reject the query images. If the processing time of about 10 ms and the rejection rate $R_1$ of about 10% are permitted, it can be said that recognition with an erroneous recognition rate of 1% or less, which hardly caused erroneous recognition, were realized.

4. Conclusion

The present invention has solved, by using generation-type learning, problems such as blur and defocus that occur in the image recognition method using nearest neighbor search for local features when a camera-equipped mobile phone is used as an image input device. As a result of the experiments using 10,000 images, it was found that the recognition rate was improved by 12.3%.

Various modifications of the present invention may be attained other than the above mentioned embodiment. Such modifications should not be deemed to be out of the scope of the present invention. The present invention should include all the modifications within the scope of the claims, their equivalents, and within the above scope.

INDUSTRIAL APPLICABILITY

According to the present invention, in image recognition using a camera-equipped mobile phone or the like as an input device for a query image, it is possible to suppress decrease in recognition accuracy due to defocus or blur occurring when an image is captured by the input device, and to perform highly accurate image recognition.

A problem occurring by the generation-type learning being introduced is that a memory amount and processing time needed for nearest neighbor search increase along with addition of learning data. The problem outstands particularly in the case of using a large-scale image database. However, it has been found that the problem can be effectively solved by applying the cascading method and scalar quantization which the inventors have already proposed.

DESCRIPTION OF THE REFERENCE CHARACTERS 11 image database
A, B, C, and D learning set

The invention claimed is:

1. An image retrieval method comprising:

a step of extracting at least one query feature vector from a query image on which a subject of the image retrieval is captured, the query feature vector representing a local feature of the query image;

a step of accessing an image data base in which a plurality of reference images are stored previously, each reference image being stored in conjunction with learning images generated therefrom and reference feature vectors representing local features of the reference image and the learning images;

a comparing step of comparing the query feature vector with the reference feature vectors stored in conjunction with each reference image using an approximate nearest neighbor search to find a reference feature vector approximately nearest to the query feature vector; and a selecting step of selecting a reference image with which the found reference feature vector is stored in conjunction from the reference images as a retrieval result wherein:

each learning image is generated by adding a defocus and/ or a motion-blur effect likely to occur on capturing the subject to each reference image, one of the reference feature vectors is extracted from each reference image using a scale-space approach and another of the reference feature vectors is extracted from each learning image corresponding to the reference image using the scale-space approach, the query feature vector is extracted from the query image using the scale-space approach, and the comparing step repeats the comparison of the query feature vector with each reference feature vector using plural degrees of approximation in order from rough to close corresponding to a processing load in order from light to heavy, respectively, the selecting step makes the comparing step repeated to perform the comparison until a basis to determine the retrieval result is provided, and each of the above steps is executed by a computer.

2. An image retrieval method according to claim 1, further comprising a scalar quantization step of quantizing a vector dimension of each reference feature vector into a predetermined number of bits.

3. An image retrieval method according to claim 2, wherein:

the scalar quantization step quantizes each vector dimension into two bits or less.

4. An image storing method according to claim 1, wherein the image data base is adapted for storing 100,000 reference images.

5. An image storing method according to claim 1, wherein the learning images are generated by adding 3-15 types of image processing having different degrees of a defocus and/ or a motion-blur effect likely to occur into the reference images respectively.

6. An image storing method according to claim 5, wherein the scale-space approach for extracting the reference feature vectors and the query feature vector includes a process in which a Gaussian filter with a different kernel size is sequentially applied to the respective reference images, the corresponding learning images and the query image in such a manner that the kernel size is increased at a certain rate, the image processing having different degrees of the defocus and/or the motion-blur effect likely to occur applies 3-15 types of the Gaussian filter whose vertical and horizontal kernel sizes are different among the respective learning images, wherein each kernel size of the Gaussian filter being applied to generate the learning images is different from each kernel size of the Gaussian filter being applied to generate the scale-space approach.

7. An image storing method for storing a reference image to be stored into an image data base for storing plural reference images and reference feature vectors extracted from the plural reference images, the image database used for an image retrieval of a particular reference image of the plural reference images matched with a query image on which a subject of the image retrieval is captured, the method comprising the steps of:

generating learning images by adding a defocus and/or a motion-blur effect likely to occur on capturing the subject to the reference image to be stored;

extracting at least one reference feature vector from the reference image to be stored and each learning image respectively; and storing the at least one extracted reference feature vector and the learning image from which the at least one reference feature vector was extracted into the image data base in conjunction with the reference image to be stored, wherein:

one of the reference feature vectors is extracted from the reference image to be stored using a scale-space approach and another of the reference feature vectors is extracted from each learning image corresponding to the reference image to be stored using the scale-space approach;

the image retrieval is executed through a procedure of extracting at least one query feature vector from the query image in the same manner as that of extracting the at least one reference feature vector, of comparing the query feature vector with the reference feature vectors extracted from the reference image and the learning images using an approximate nearest neighbor search to find a particular reference feature vector approximately nearest to the query feature vector and of selecting the particular reference image with which the particular reference feature vector is stored;

the comparing step repeats the comparison of the query feature vector with each reference feature vector using plural degrees of approximation in order from rough to close corresponding to a processing load in order from light to heavy, respectively;

the selecting step makes the comparing step repeated to perform the comparison until a basis to determine the particular reference image is provided; and each of the above steps is executed by a computer.

8. An image storing method according to claim 7, wherein the image data base is adapted for storing 100,000 reference images.

9. An image storing method according to claim 7, wherein the learning images are generated by adding 3-15 types of image processing having different degrees of a defocus and/or a motion-blur effect likely to occur into the reference images respectively.

10. An image storing method according to claim 9, wherein the scale-space approach for extracting the reference feature vectors and the query feature vector includes a process in which a Gaussian filter with a different kernel size is sequentially applied to the respective reference images, the corresponding learning images and the query image in such a manner that the kernel size is increased at a certain rate, the image processing having different degrees of the defocus and/or the motion-blur effect likely to occur applies 3-15 types of the Gaussian filter whose vertical and horizontal kernel sizes are different among the respective learning images, wherein each kernel size of the Gaussian filters being applied to generate the learning images is different from each kernel size of the Gaussian filter being applied to generate the scale-space approach.

11. A non-transitory computer-readable storage media with an executable program stored thereon, wherein the program instructs a processor to execute steps comprising:

extracting at least one query feature vector from a query image on which a subject of an image retrieval is captured, the query feature vector representing a local feature of the query image;

accessing an image data base in which a plurality of reference images are stored previously, each reference image being stored in conjunction with learning images generated therefrom and reference feature vectors representing local features of the reference image and the learning images;

comparing the query feature vector with the reference feature vectors stored in conjunction with each reference image using an approximate nearest neighbor search to find a reference feature vector approximately nearest to the query feature vector; and selecting a reference image with which the found reference feature vector is stored in conjunction from the reference images as a retrieval result wherein:

each learning image is generated by adding a defocus and/or a motion-blur effect likely to occur on capturing the subject to each reference image, one of the reference feature vectors is extracted from each reference image using a scale-space approach and another of the reference feature vectors is extracted from each learning image corresponding to the reference image using the scale-space approach, the query feature vector is extracted from the query image using the scale-space approach, the comparing step repeats the comparison of the query feature vector with each reference feature vector using plural degrees of approximation in order from rough to close corresponding to a processing load in order from light to heavy, respectively, and the selecting step makes the comparing step repeated to perform the comparison until a basis to determine the retrieval result is provided.

* * * * *